Patented Feb. 2, 1926.

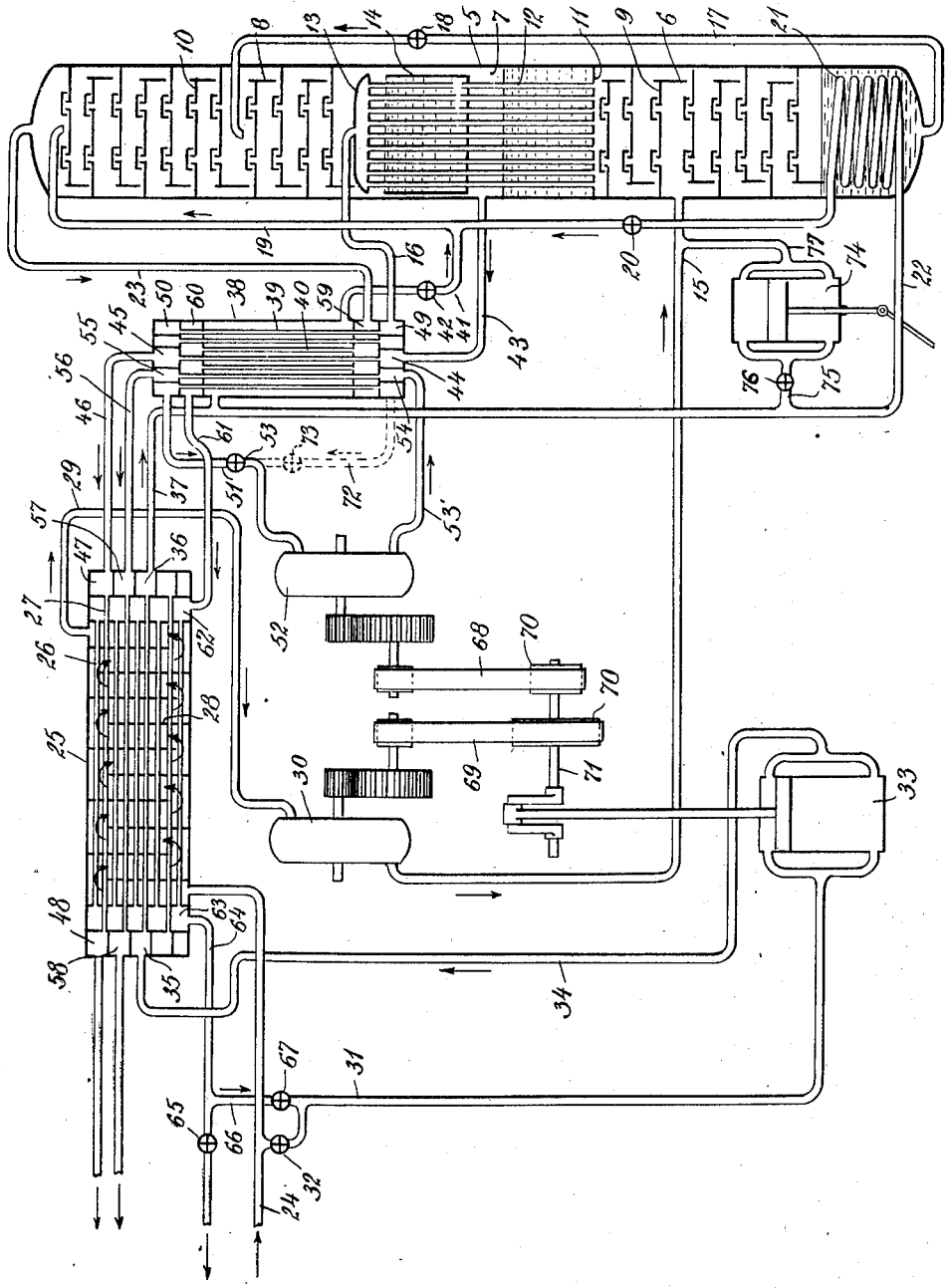

1,571,461

UNITED STATES PATENT OFFICE.

CLAUDE C. VAN NUYS, OF CRANFORD, AND WALTER WILKINSON, OF JERSEY CITY, NEW JERSEY, ASSIGNORS TO AIR REDUCTION COMPANY, INCORPORATED, OF NEW YORK, N. Y., A CORPORATION OF NEW YORK.

SEPARATION OF THE CONSTITUENTS OF GASEOUS MIXTURES.

Application filed June 24, 1924. Serial No. 722,036.

*To all whom it may concern:*

Be it known that we, CLAUDE C. VAN NUYS, a citizen of the United States, residing at Cranford, county of Union, State of New Jersey, and WALTER WILKINSON, a citizen of the United States, residing at Jersey City, county of Hudson, State of New Jersey, have invented certain new and useful Improvements in Separation of the Constituents of Gaseous Mixtures; and we do hereby declare the following to be a full, clear, and exact description of the invention, such as will enable others skilled in the art to which it appertains to make and use the same.

This invention relates to a method of and apparatus for separating the constituents of gaseous mixtures by liquefaction. It is applicable to the treatment of air to produce oxygen-enriched mixtures and it can also be utilized for a more complete separation of oxygen and nitrogen from air and for the recovery of gases in various mixtures.

The method is adaptable more especially in systems where the necessary refrigeration is produced by the expansion of all or a portion of the gaseous fluid to be separated in suitable engines or turbines and particularly, though not exclusively, where the operations are carried out in apparatus of large capacity. In such apparatus the initial pressure required to produce the necessary refrigerative effect and to cause the separation of the constituents of the mixture by distillation and rectification is substantially lower than in systems such as are in industrial use today for producing oxygen of relatively high purity for compression in cylinders. This lower initial pressure is possible because of the decreased area per unit of gas handled which is exposed to inleakage of external heat and also to the higher efficiency of expansion machines in the larger sizes. With low initial pressures it is possible, for example, to utilize rotary expansion machines, such as turbines, which attain greater efficiency at low pressures than is possible for expansion machines of the reciprocating type. Rotary expansion machines avoid, moreover, the pulsation effects which are produced by reciprocating machines in the rectification part of the system.

It is the object of the invention to increase the efficiency attainable in the liquefaction of gaseous mixtures, to permit control thereof in a more satisfactory manner, and particularly to secure the desired results with the minimum consumption of energy.

In all liquefaction systems the liquefaction of that portion of the working fluid which must be liquefied is accomplished, as far as is possible, by causing it to evaporate bodies of liquid which have been accumulated previously and which have already undergone separation. Under ideal conditions, i. e., if the system were thermodynamically reversible and perfectly insulated from external heat, all the necessary liquid could be produced in this manner. Actually, such systems involve various irreversibilities and insulation is more or less imperfect. It is necessary, therefore, to provide additional refrigeration in order to produce surplus liquid to compensate for that portion which is evaporated in the system without the formation of corresponding liquid to replace it.

This is accomplished by causing the cold outgoing expanded vapor products to come into heat-exchanging relation with compressed incoming fluid, a portion of that fluid being thereby liquefied. The quantity of surplus liquid thus produced should be just that necessary to compensate for the losses above noted, and the pressure of the incoming fluid must be high enough so that, when a portion thereof is expanded in a nozzle or expansion machine, the necessary amount of refrigeration will be produced.

In systems of relatively small capacity such as are in industrial use today, the necessary high initial pressure in the working fluid precludes any difficulty in thus providing supplementary liquid in a rapid and positive manner, the liquefaction temperature of the compressed incoming fluid at the pressure maintained being such that it is easily liquefied by heat exchange with the outgoing expanded products. The quantity of surplus liquid produced is regulated by the quantity of high pressure fluid brought into heat-exchanging relation with the cold expanded outgoing products and the formation of liquid is not affected materially by variations in the operating conditions. Such variations are unavoidable in any liquefaction apparatus and may be the result of changes in the efficiency of the expansion device, variations of outside temperature, the blowing out of accumulated solids such as carbon dioxide, or frost in the interchangers, or of a number of other causes.

In systems of large capacity, however, as above noted, the required initial pressure in the working fluid in order to provide for the necessary refrigeration is much lower and the temperature at which the incoming fluid liquefies thus approaches more closely that of the outgoing expanded products. Liquefaction of that fluid by heat exchange with those products occurs much less rapidly because of this smaller difference of temperature. Therefore, such systems are less adaptable to variations in operating conditions, although the lower pressure may provide sufficient refrigeration to maintain the system under steady conditions. Whenever, because of some variations in operating conditions, the supply of liquid becomes depleted, the accumulation of make-up liquid by heat exchange of a portion of the incoming fluid with expanded vapor products is liable to be slow and tedious unless provision is made for a substantial increase in the pressure of that fluid.

The method hereinafter described provides for the efficient and rapid production of supplementary bodies of liquid while still maintaining the advantages pointed out above in connection with the possible low pressures necessary in the major portion of the working fluid entering the cycle. It also avoids a serious cause of inefficiency in systems of capacities comparable with those in industrial use today.

In the most efficient air liquefaction method in operation today, employing expansion with external work, the initial pressure necessary in the gaseous mixture is somewhat lower than the critical pressure thereof, so that as it is liquefied a change of phase occurs. Considerations of efficiency require that the incoming fluid after it is liquefied be brought as closely as possible to the temperature of the expanded products causing the liquefaction. Since the temperature of liquefaction in such methods is substantially higher than the temperature of those products, it is necessary, if we wish to attain maximum efficiency, that the liquid produced be sub-cooled considerably below its liquefaction point before its pressure is lowered and it comes into thermal contact, in the distillation part of the apparatus, with bodies of liquid to be evaporated.

When the liquefaction is accompanied by change of phase, a very great reduction of volume occurs and it is found to be difficult to accomplish this subcooling on account of the trouble experienced in retaining the liquid, after it has been formed, sufficiently long in contact with the expanded products. In fact, in the well known air liquefaction method mentioned, employing expansion with external work, no attempt is made to subcool the make-up liquid previous to its throttling to the lower pressure of the rectification part of the apparatus. The dissipation of available energy arising from this throttle expansion of the liquid at the relatively high initial pressure is much greater when that liquid previous to throttling is at the temperature of liquefaction corresponding to that pressure than it would be were the liquid previous to throttling subcooled to a temperature approaching that of the cold expanded outgoing products. This dissipation of available energy causes a serious decrease of efficiency in the known method and is one of the major irreversibilities thereof. The method herein described contemplates the compression to a relatively high pressure of a minor fraction either of the air entering the cycle or of the separated nitrogen leaving it, the major portion of the incoming mixture to be separated being compressed only to that pressure necessary in order to furnish the required refrigeration when expanded in expansion engines or turbines. The pressure of the minor fraction of the working fluid may be even above the critical pressure thereof so that as it undergoes liquefaction there will be no discontinuous reduction of volume resulting from phase change during the liquefaction, and the difficulty of retaining the fluid sufficiently long in heat-exchanging relation with the cold expanded outgoing products is substantially avoided. For this reason and also on account of the possibility of independently varying both the pressure and the quantity of the high pressure fluid, the method hereinafter described avoids many of the inefficiencies of the present systems, while still maintaining the advantages of the low pressures possible in the major portion of the working fluid.

The present invention also embodies an important advantage in connection with the separation of the mixture treated. In the application of Claude C. Van Nuys, Serial No. 615,977, filed January 31, 1923, there is described a method wherein a portion of the incoming compressed air is liquefied by thermal contact with the enriched liquid derived from the tubes of a tubular vaporizer, and rectified in trays below the vaporizer tubes. The unliquefied residue is expanded to provide additional refrigeration. That method makes it possible to produce an oxygen-enriched liquid carrying substantially greater percentages of oxygen than is possible by use of the principle of "backward return" alone because a preliminary rectification is accomplished at the vaporizer pressure before the enriched liquid is throttled to the lower pressure prevailing around the vaporizer tubes. The method as there disclosed contemplates the production of an oxygen-nitrogen mixture enriched in oxygen above the composition for atmospheric air only to that degree which is obtainable by means of the tubular vaporizer and rectifier trays shown. Compositions in oxygen higher than, say 60%, would be difficult to attain by that method unless means were provided for obtaining definite quantities of liquid nitrogen, more or less pure, to be used as reflux.

This reflux nitrogen could be obtained, as in the well known commercial method above mentioned, by liquefying in a suitable condenser, located at an intermediate level of the rectifier, all or a portion of the uncondensed nitrogen residue delivered at the top of the tubular vaporizer. In that method the quantity of residual nitrogen thus available is greater than that necessary for use as reflux, after liquefaction. This uncondensed nitrogen, as it leaves the vaporizer, is under a pressure of several atmospheres and the excess amount might be employed advantageously as working fluid in an expansion engine or turbine. However, when a nitrogen expander or turbine is employed for this purpose, as shown in said copending application, the liquefaction of the uncondensed residual nitrogen not so expanded is troublesome because the nitrogen expander slightly lowers the pressure prevailing in the tubular vaporizer.

For this reason, in the well known method above mentioned, no attempt is made to utilize for expansion any portion of the residual vaporizer nitrogen not necessary as reflux, but only that quantity of nitrogen is withdrawn from the top of the vaporizer which is utilized for reflux. All the rest of the fluid entering the vaporizer is liquefied in the tubes thereof, withdrawn at the bottom and throttled through a valve to the low pressure prevailing in the rectifier proper. By this throttling of an unnecessary quantity of fluid, a considerable amount of available energy is wasted and the economy of the whole process is correspondingly decreased.

The present method avoids these disadvantages. The separately compressed high pressure air or nitrogen enters the cycle through the temperature exchangers and, before being throttled, is brought substantially to the temperature of the cold expanded outgoing products. It serves not only to provide the make-up liquid necessary as above explained, but, after passing a throttle valve, is further utilized as reflux liquid, making it possible in this method to attain oxygen percentages as high as desirable. The method of rectification below the tubular vaporizer as described in said copending application is used, except that the fluid circulating in the coil located at the base of the apparatus may be separated nitrogen instead of unseparated air as in that application. This feature is desirable inasmuch as the amount of fluid necessarily liquefied for compensating liquid may be insufficient for use as reflux liquid. The liquefaction of additional amounts of fluid in said coil makes it possible to attain greater amounts of uncondensed residual nitrogen at the top of the vaporizer to be expanded in the nitrogen expander. This increases the refrigerative effect available in the cycle, making it possible to operate at a lower pressure in the main compressor, which delivers to the cycle the air to be separated.

An important feature of the present method is that, by the employment of the coil below the main tubular vaporizer the quantity of uncondensed residual nitrozen available at the top of that vaporizer is substantially increased, while at the same time the concentration of the oxygen to be separated is increased in the enriched oxygen liquid which is subsequently throttled into the main column rectifier above the vaporizer. This smaller amount of oxygen-nitrogen mixture to be rectified makes the quantity of reflux liquid necessary also smaller, roughly in the same ratio. By taking advantage of this fact, the size of the rectifier located above the tubular vaporizer may be much decreased, all of which tends to increase the economy of the operation.

Another important advantage of the present method is the fact that by the use of the reflux compressor as described, the pressure of the air as it enters the cycle to be separated may, in plants of large capacity, be attained with the use of a compressor of the type commonly known as blower or rotary. The difficulty that might arise in initially cooling the apparatus, provided such a compressor were the only one present in the cycle, is obviated by the fact that the intense refrigerative effect, as well as the initial supply of liquid, during the starting period may be obtained easily by reason of the high pressure fluid delivered by the high pressure compressor. During the starting period or during normal operation it may be advisable to expand all or a portion of the fluid delivered by this compressor in an expansion machine in order to obtain an initial or increased liquid supply.

The compression of the fluid which is liquefied either in the so-called liquefier or in the coil located below the tubular vaporizer may be accomplished in a machine distinct from the main cycle compressor and the power delivered by the expansion apparatus may or may not be utilized to assist in this compression. This feature, combined with the principle exhibited in a copending application of C. C. Van Nuys and Walter Wilkinson, Serial No. 740,929, filed Oct. 1, 1924, of employing this power to drive an auxiliary compressor makes it possible to utilize said expansion machine power in an efficient manner. The variations of the amounts of that power tend, when applied to the cycle in the manner just indicated, to stabilize the conditions therein.

When any increase of refrigerative effect is produced the amount of power delivered by the machines increases and hence the quantity or pressure of the fluid undergoing compression for use as reflux may also be increased, thus furnishing liquid to the cycle in a rapid and positive manner. During the starting period it may be advisable to operate the reflux compressor by the direct expenditure of power as, for example, by an electric motor or gas engine connected directly to said compressor. In fact, even during normal operation it might be advantageous to connect the compressor directly to some source of power supply.

In carrying out the invention an apparatus such as that hereinafter described is preferably employed. The apparatus is illustrated diagrammatically in the accompanying drawing, it being understood that details which are well known to those skilled in the art are omitted for the purpose of clarity.

Referring to the drawing, 5 indicates a column having compartments 6, 7 and 8. In the compartment 6 a plurality of trays 9 are provided, these trays being of the usual type employed for rectification purposes. Similar trays 10 are arranged in the compartment 8. A partition 11 separates the compartments 6 and 7 and a plurality of tubes 12 extend through the partition 11 and terminate in a head 13. A receptacle 14 surrounds the tubes 12 in the upper part of the compartment 7.

The air or other fluid to be treated, after compression, cooling, and expansion, as hereinafter described, enters the compartment 6 through a pipe 15. The air passes upwardly through the trays 9, together with vapors rising from the bottom of the compartment, and the mixture enters the tubes 12 which are surrounded by bodies of liquid accumulated in the receptacle 14 and in the bottom of the compartment 7. As the result of heat interchange a partial or selective liquefaction occurs and the liquid flows backwardly in contact with the incoming mixture in accordance with the principles of "backward return" rectification. The liquid, being enriched in the more readily condensable constituent of the mixture, flows from the tubes 12 onto the trays 9 and continues its downward course first in contact with the incoming air or other fluid and vapors rising from the bottom of the compartment 6 and then with those vapors after the inlet pipe 15 has been passed. As the result the liquid becomes more enriched in the more readily condensable constituent of the mixture and finally accumulates in the bottom of the compartment 6. The unliquefied residual gas from the tubes 12 escapes through the head 13 and a pipe 16.

The liquid accumulated in the bottom of the compartment 6 is delivered through a pipe 17 and expansion valve 18 at an intermediate point in the compartment 8 above certain of the trays 10 therein. This liquid flows downwardly over the trays in contact with vapors rising from the compartment 7 which vapors are formed by the heat exchange between the bodies of liquid and the fluid passing through the tubes 12. During the contact of the vapors and liquid in the compartment 8 the liquid becomes more enriched in the more readily condensable constituent while the less readily condensable constituent is accumulated in the vapors in accordance with well understood principles of rectification.

The reflux which is essential to the more complete separation of the more readily condensable constituent from the vapors is delivered to the upper part of the compartment 8 through a pipe 19 and expansion valve 20. The major portion of this liquid is produced in a coil 21 disposed in the bottom of the compartment 6. A fluid, preferably nitrogen if air is being separated, is delivered to this coil through a pipe 22, and in passing through the coil it is liquefied in vaporizing a portion of the liquid accumulated in the bottom of the compartment 6. The liquid, after expansion through the valve 20 and delivery to the compartment 8, flows downwardly over the trays 10 therein and finally joins the liquid which is introduced through the pipe 17. If nitrogen is used as a reflux in the separation of the constituents of air, the result of the rectification is an oxygen liquid of high purity and an effluent consisting principally of nitrogen which escapes from the top of the column through a pipe 23.

The air or other fluid entering the system is introduced through a pipe 24 after compression and cooling in accordance with well understood principles. The major portion of the air or other fluid is delivered by the pipe 24 to an exchanger 25 consisting of a shell and a plurality of tubes 26 and 27 extending therethrough and terminating in chambers at the ends of the exchanger. Baffles 28 are provided to cause a circulation of the entering fluid about the tubes 26 and 27 so that the full benefit of heat exchange with the outgoing vapors is assured. After passing through the exchanger the fluid escapes to a pipe 29 which delivers it to an expansion engine or turbine 30 where it is expanded with external work. After expansion the cold fluid is delivered to the pipe 15 and thence to the chamber 6 of the column.

A portion of the incoming fluid may be diverted through a pipe 31 controlled by a valve 32 and delivered to a compressor 33 which is adapted to bring that portion of the fluid to a relatively high pressure as compared with the pressure of the major portion of the fluid. After compression and cooling in the usual water coolers to remove the heat of compression, the high pressure fluid passes through a pipe 34 to a chamber 35 at one end of the exchanger 25. The fluid passes thence through tubes 27 to a corresponding chamber 36 at the opposite end of the exchanger and escapes therefrom through a pipe 37 leading to a liquefier 38. The pipe 37 also communicates with the pipe 22 so that all or a portion of the fluid can be caused to enter the coil 21 in the bottom of the column, and after liquefaction therein by heat exchange with the liquid accumulated in the bottom of the column it is delivered through the pipe 19 and valve 20 to the top of the column as hereinbefore described.

The liquefier 38 comprises a shell and a plurality of tubes 39 and 40 communicating with chambers at the ends of the liquefier. The portion of the high pressure fluid which enters the liquefier circulates about the tubes 39 and 40 and is liquefied by heat exchange with the cold products flowing through the tubes. The liquid is delivered by a pipe 41 controlled by a valve 42 to the pipe 19. It will be seen that by means of the valves 20 and 42 the amount of high pressure fluid passing through the coil 21 and the exchanger 38 can be regulated at will. The liquid produced in either case is delivered at the top of the compartment 8.

As the result of the operation as described, liquid flows downwardly over the trays 10 and accumulates in the compartment 7 and the receptacle 14. At the same time the entering fluid passes upwardly through the trays 9 and the tubes 12 with resulting selective liquefaction which produces a liquid enriched in the more readily condensable constituent. This liquid flows downwardly over the trays 9 with resulting further enrichment and accumulates about the coil 21, thus furnishing the refrigerative effect necessary to produce the reflux liquid which is delivered to the upper end of the column through the pipe 19. The liquid which is not evaporated about the coil 21 is delivered through the pipe 17 and the valve 18 and joins the reflux liquid flowing to the compartment 7.

A portion of the vapor produced in the compartment 7 by evaporation of the liquid therein is withdrawn through a pipe 43 and constitutes one of the products of the operation. This vapor is conveyed to a chamber 44 at one end of the liquefier 38 and passes through the tubes 39 to a corresponding chamber 45 at the opposite end of the liquefier. Thence it is delivered through a pipe 46 to a chamber 47 at one end of the exchanger 25 and passes through the tubes 27 therein to a chamber 48 at the opposite end of the exchanger. This product, which is oxygen or an enriched oxygen mixture in the case in which air is supplied to the system, may be utilized in cooling other exchangers employed in the system, and when it has been brought to substantially atmospheric temperature it is stored in suitable receptacles, a gasometer (not shown) being employed usually for this purpose.

The residual unliquefied gas, for example nitrogen, which escapes through the pipe 16, is delivered to a chamber 49 at one end of the liquefier 38 and passes through the tubes 39 to a corresponding chamber 50 at the opposite end of the liquefier. It is withdrawn from this chamber through a pipe 51 and is delivered to an expansion engine or turbine 52, a valve 53 being provided for the control thereof. After expansion with external work the cold vapor is delivered through a pipe 53' to a chamber 54 at one end of the liquefier 38 and passes through the tubes 39 to a corresponding chamber 55 at the opposite end of the liquefier. Thence the vapor passes through a pipe 56 to a chamber 57 at one end of the exchanger 25 and is delivered through the tubes 27 to a chamber 58 at the opposite end of the exchanger. The cold vapor may be employed for cooling the other exchangers in the system and when it has been brought to atmospheric temperature it can be stored in suitable receptacles or discharged to the atmosphere.

The effluent from the top of the column which escapes through the pipe 23 may vary in composition depending upon the degree of separation which is effected in the column. It is delivered to a chamber 59 at one end of the liquefier 38 and passes through the tubes 40 to a corresponding chamber 60 at the opposite end of the liquefier. Thence it travels through the pipe 61 to a chamber 62 at one end of the exchanger 25. It is delivered by the tubes 26 to a chamber 63 at the opposite end of the exchanger and is withdrawn therefrom through a pipe 64. A valve 65 is provided in the pipe 64 to control the passage of the effluent therethrough.

The effluent may, in the event that air is treated, consist principally of nitrogen with more or less oxygen mixed therewith. All or a portion of the effluent can be diverted through a pipe 66 controlled by a valve 67 to the compressor 33 and when compressed to the higher pressure it follows the path hereinbefore outlined for the fluid which is withdrawn from the pipe 24 and compressed in the compressor 33. The valves 32 and 67 may be operated at will to direct the desired fluid to the compressor 33. This permits of the use of air, for example, in the compressor 33 in starting the operation and the subsequent employment of air or nitrogen to produce the reflux liquid. To ensure the highest degree of separation of the constituents of air it is essential to provide liquid nitrogen of relatively high purity as a reflux and this is easily accomplished by the proper operation of the valves as described.

In starting it is understood that there is no liquid in the system and that the entering fluid is compressed and expanded in the engine or turbine 30. The fluid is thus cooled and enters the column, passing through the tubes 12 without liquefaction, and escaping through the pipe 16. The cold fluid enters the liquefier 38 where it meets the fluid which has been compressed in the compressor 33 to a higher pressure with resulting liquefaction. The liquid thus produced is delivered to the column and immediately commences to vaporize therein, the cold vapors escaping through the pipe 23 and passing to the liquefier where they assist in the further liquefaction of the high pressure fluid. Eventually liquid is accumulated in the column and surrounds the tubes 12. Thereafter liquefaction occurs in the tubes with resulting accumulation of liquid in the bottom of the compartment 6, thus making it possible to produce liquid in the coil 21 and at the same time to supply liquid to the compartment 8 through the pipe 17. At this stage the column is in full operation and by suitable regulation of the valves the rectification and separation of the constituents of the gaseous mixture can be effected.

To increase the refrigerative effect in starting the high pressure fluid can be expanded in an expansion machine 74 which is connected by a pipe 75 to the pipe 22. A valve 76 controls the inlet to this machine. A pipe 77 delivers the expanded fluid to the pipe 15 through which it passes to the compartment 6 of the column.

The expansion of the high pressure fluid and of the residual unliquefied gas from the column develops power which can be utilized in operating the compressor 33 or for any other purpose. In the drawing the turbines 33 and 52 are illustrated diagrammatically as if connected by belts 68 and 69 to pulleys 70 on the driving shaft 71 of the compressor 33. It is to be understood that any suitable connection, either mechanical or electrical, may be employed in transmitting the power developed by the turbines to the compressor.

In some instances it may be desirable to expand the residual unliquefied gas without first passing it through the tubes of the liquefier 38. For this purpose a bypass 72 controlled by a valve 73 connects the chamber 49 with the pipe 51. When the valve 73 is open the gas passes directly from the column to the expansion engine or turbine 52.

Some of the advantages of the invention have been set forth and others will be apparent from a consideration of the method of operating as described. That method is applied more particularly to the treatment of air to separate its constituents, oxygen and nitrogen. The method and apparatus may be employed, however, in the separation of other mixtures, the constituents of which have corresponding characteristics.

Various changes may be made in the details and arrangement of the various steps of the method and of the means employed without departing from the invention or sacrificing any of the advantages thereof.

We claim:—

1. The method of separating the constituents of gaseous mixtures, which comprises compressing, cooling and partially expanding the gaseous mixture, subjecting the expanded gaseous mixture to liquefaction, liquefying a gaseous medium at a pressure exceeding the initial pressure of the gaseous mixture and combining the liquids under rectifying conditions.

2. The method of separating the constituents of gaseous mixtures, which comprises compressing, cooling and partially expanding the gaseous mixture, subjecting the expanded gaseous mixture to selective liquefaction, liquefying a gaseous medium at a pressure exceeding the initial pressure of the gaseous mixture and combining the liquids under rectifying conditions.

3. The method of separating the constituents of gaseous mixtures, which comprises compressing and cooling the gaseous mixture, partially expanding it with external work, subjecting the expanded gaseous mixture to liquefaction, liquefying a gaseous medium at a pressure exceeding the initial pressure of the gaseous mixture and combining the liquids under rectifying conditions.

4. The method of separating the constituents of gaseous mixtures, which comprises compressing and cooling the gaseous mixture, partially expanding it with external work, subjecting the expanded gaseous mixture to selective liquefaction, liquefying a gaseous medium at a pressure exceeding the initial pressure of the gaseous mixture and combining the liquids under rectifying conditions.

5. The method of separating the constituents of gaseous mixtures, which comprises compressing, cooling and partially expanding the gaseous mixture, subjecting the expanded gaseous mixture to liquefaction, liquefying a gaseous medium at a pressure exceeding the initial pressure of the gaseous mixture and combining the liquids after one has been subjected to partial rectification.

6. The method of separating the constituents of gaseous mixtures, which comprises compressing, cooling and partially expanding the gaseous mixture, subjecting the expanded gaseous mixture to liquefaction, liquefying a gaseous medium at a pressure exceeding the initial pressure of the gaseous mixture and combining the liquids after both have been subjected to partial rectification.

7. The method of separating the constituents of gaseous mixtures, which comprises compressing, cooling and partially expanding the gaseous mixture, subjecting the expanded gaseous mixture to liquefaction, liquefying a gaseous medium at a pressure exceeding the initial pressure of the gaseous mixture, combining the liquids after one has been subjected to partial rectification and completing the rectification of the combined liquids.

8. The method of separating the constituents of gaseous mixtures, which comprises compressing, cooling and partially expanding the gaseous mixture, subjecting the expanded gaseous mixture to liquefaction, liquefying a gaseous medium at a pressure exceeding the initial pressure of the gaseous mixture by evaporating a portion of the liquid produced from the latter and combining the liquids under rectifying conditions.

9. The method of separating the constituents of gaseous mixtures, which comprises compressing, cooling and partially expanding the gaseous mixture, subjecting the expanded gaseous mixture to selective liquefaction, liquefying a gaseous medium at a pressure exceeding the initial pressure of the gaseous mixture and combining the liquids after one has been subjected to partial rectification.

10. The method of separating the constituents of gaseous mixtures, which comprises compressing, cooling and partially expanding the gaseous mixture, subjecting the expanded gaseous mixture to selective liquefaction, liquefying a gaseous medium at a pressure exceeding the initial pressure of the gaseous mixture and combining the liquids after both have been subjected to partial rectification.

11. The method of separating the constituents of gaseous mixtures, which comprises compressing, cooling and partially expanding the gaseous mixture, subjecting the expanded gaseous mixture to selective liquefaction, liquefying a gaseous medium at a pressure exceeding the initial pressure of the gaseous mixture, combining the liquids after one has been subjected to partial rectification and completing the rectification of the combined liquids.

12. The method of separating the constituents of gaseous mixtures, which comprises compressing, cooling and partially expanding the gaseous mixture, subjecting the expanded gaseous mixture to selective liquefaction, liquefying a gaseous medium at a pressure exceeding the initial pressure of the gaseous mixture by evaporating a portion of the liquid produced by selective liquefaction and combining the liquids under rectifying conditions.

13. The method of separating the constituents of gaseous mixtures, which comprises compressing, cooling and partially expanding the gaseous mixture, subjecting the expanded gaseous mixture to selective liquefaction, liquefying a gaseous medium at a pressure exceeding the initial pressure of the gaseous mixture by evaporating a portion of the liquid produced by selective liquefaction and combining the liquids after one of the liquids has been subjected to partial rectification.

14. The method of separating the constituents of gaseous mixtures, which comprises compressing, cooling and partially expanding the gaseous mixture, subjecting the expanded gaseous mixture to selective liquefaction, liquefying a gaseous medium at a pressure exceeding the initial pressure of the gaseous mixture by evaporating a portion of the liquid produced by selective liquefaction and combining the liquids after both of the liquids have been subjected to partial rectification.

15. The method of separating the constituents of gaseous mixtures, which comprises compressing, cooling and partially expanding the gaseous mixture, subjecting the expanded gaseous mixture to selective liquefaction, liquefying a gaseous medium at a pressure exceeding the initial pressure of the gaseous mixture by evaporating a portion of the liquid produced by selective liquefaction, combining the liquids after one of the liquids has been subjected to partial rectification and completing the rectification of the combined liquids.

16. The method of separating the constituents of gaseous mixtures, which comprises compressing, cooling and partially expanding the gaseous mixture, liquefying the expanded gaseous mixture and rectifying the vapors separating from the liquid by contact with a reflux provided by liquefying a constituent of the gaseous mixture at a pressure exceeding the initial pressure thereof.

17. The method of separating the constituents of gaseous mixtures, which comprises compressing, cooling and partially expanding the gaseous mixture, subjecting the expanded gaseous mixture to selective liquefaction and rectifying the vapors separating from the liquid by contact with a reflux provided by liquefying a constituent of the gaseous mixture at a pressure exceeding the initial pressure thereof.

18. The method of separating the constituents of gaseous mixtures, which comprises compressing, cooling and partially expanding the gaseous mixture, subjecting the expanded gaseous mixture to selective liquefaction and rectifying the vapors separating from the liquid by contact with a reflux provided by liquefying a constituent of the gaseous mixture at a pressure exceeding the initial pressure thereof in heat exchange with the liquid produced by selective liquefaction.

19. The method of separating the constituents of gaseous mixtures, which comprises compressing, cooling and partially expanding the gaseous mixture, subjecting the expanded gaseous mixture to selective liquefaction, liquefying a gaseous medium at a pressure exceeding the initial pressure of the gaseous mixture, combining the liquids under rectifying conditions and expanding the residual unliquefied gaseous product of the selective liquefaction.

20. The method of separating the constituents of gaseous mixtures, which comprises compressing, cooling and partially expanding the gaseous mixture, subjecting the expanded gaseous mixture to selective liquefaction, liquefying a gaseous medium at a pressure exceeding the initial pressure of the gaseous mixture, combining the liquids under rectifying conditions, expanding the residual unliquefied gaseous product of the selective liquefaction and utilizing the cold expanded product as a refrigerant.

21. The method of separating the constituents of gaseous mixtures, which comprises subjecting the gaseous mixture to liquefaction, and subjecting the vapors from the liquid product to rectification with a reflux consisting of a gaseous medium liquefied at a pressure exceeding the initial pressure of the gaseous mixture by heat transfer to said liquid product.

22. The method of separating the constituents of gaseous mixtures, which comprises subjecting the gaseous mixture to selective liquefaction, and subjecting the vapors from the liquid product to rectification with a reflux consisting of a gaseous medium liquefied at a pressure exceeding the initial pressure of the gaseous mixture by heat transfer to said liquid product.

23. The method of separating the constituents of gaseous mixtures, which comprises subjecting the gaseous mixture to liquefaction, rectifying the liquid produced and subjecting vapors from the liquid product of the first rectification to the action of a reflux consisting of a gaseous medium liquefied at a pressure exceeding the initial pressure of the gaseous mixture by heat transfer to said liquid product.

24. The method of separating the constituents of gaseous mixtures, which comprises subjecting the gaseous mixture to selective liquefaction, rectifying the liquid produced and subjecting vapors from the liquid product of the first rectification to the action of a reflux consisting of a gaseous medium liquefied at a pressure exceeding the initial pressure of the gaseous mixture by heat transfer to said liquid product.

25. The method of separating the constituents of gaseous mixtures, which comprises subjecting the gaseous mixture to liquefaction, rectifying the vapor from the liquid first produced by direct contact with additional portions of the liquid and subjecting the vapor from the liquid product of the first rectification to the action of a reflux consisting of a gaseous medium liquefied at a pressure exceeding the initial pressure of the gaseous mixture by heat transfer to the liquid product of the first rectification.

26. The method of separating the constituents of gaseous mixtures, which comprises subjecting the gaseous mixture to selective liquefaction, rectifying the vapor from the liquid first produced by direct contact with additional portions of the liquid and subjecting the vapor from the liquid product of the first rectification to the action of a reflux consisting of a gaseous medium liquefied at a pressure exceeding the initial pressure of the gaseous mixture by heat transfer to the liquid product of the first rectification.

27. The method of separating the constituents of gaseous mixtures, which comprises compressing, cooling, partially expanding and liquefying the gaseous mixture and subjecting the vapors from the liquid product to rectification with a reflux consisting of a gaseous medium liquefied at a pressure exceeding the initial pressure of the gaseous mixture by heat transfer to said liquid product.

28. The method of separating the constituents of gaseous mixtures, which comprises liquefying the gaseous mixture selectively to produce a liquid enriched in one of the constituents, liquefying a gaseous medium at a pressure exceeding the initial pressure of the gaseous mixture by heat transfer to the enriched liquid and utilizing the liquefied gaseous medium as a reflux to rectify vapors from the enriched liquid.

29. An apparatus for separating the constituents of gaseous mixtures, comprising means for compressing, cooling and partially expanding the gaseous mixture, means for liquefying the expanded gaseous mixture, means for compressing a gaseous medium to a pressure exceeding the initial pressure of the gaseous mixture, means for liquefying the gaseous medium, a rectification column and means for introducing the two liquids separately thereto.

30. An apparatus for separating the constituents of gaseous mixtures, comprising means for compressing, cooling and partially expanding the gaseous mixture, means for liquefying the expanded gaseous mixture, means for compressing a gaseous medium to a pressure exceeding the initial pressure of the gaseous mixture, means for liquefying the gaseous medium, a rectification column and means for introducing the two liquids separately thereto at different levels therein.

31. An apparatus for separating the constituents of gaseous mixtures, comprising means for compressing, cooling and partially expanding the gaseous mixture, means for liquefying the expanded gaseous mixture, means for compressing a gaseous medium to a pressure exceeding the initial pressure of the gaseous mixture, means for liquefying the gaseous medium, a rectification column, means for introducing the two liquids separately thereto and means for partially rectifying one of the liquids before they are combined.

32. An apparatus for separating the constituents of gaseous mixtures, comprising means for compressing, cooling and partially expanding the gaseous mixture, means for liquefying the expanded gaseous mixture, means for compressing a gaseous medium to a pressure exceeding the initial pressure of the gaseous mixture, means for liquefying the gaseous medium by evaporating a portion of the liquid produced from the gaseous mixture, a rectification column and means for introducing the two liquids separately thereto.

33. An apparatus for separating the constituents of gaseous mixtures, comprising means for compressing, cooling and partially expanding the gaseous mixture, means for liquefying the expanded gaseous mixture, means for compressing a gaseous medium to a pressure exceeding the initial pressure of the gaseous mixture, means for liquefying the gaseous medium, a rectification column, means for introducing the two liquids separately thereto and means for partially rectifying both of the liquids before they are combined.

In testimony whereof we affix our signatures.

CLAUDE C. VAN NUYS.
WALTER WILKINSON.